(12) United States Patent
Yasumura

(10) Patent No.: US 6,496,389 B1
(45) Date of Patent: Dec. 17, 2002

(54) POWER FACTOR IMPROVING SWITCHING CIRCUIT

(75) Inventor: Masayuki Yasumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/665,514

(22) Filed: Sep. 19, 2000

(30) Foreign Application Priority Data

Sep. 21, 1999 (JP) .......................... 11-267155

(51) Int. Cl.⁷ .............................. H02M 3/335
(52) U.S. Cl. ................ 363/21.04; 363/21.02; 363/97
(58) Field of Search .................. 363/18, 19, 21.02, 363/21.04, 21.08, 97, 131

(56) References Cited

U.S. PATENT DOCUMENTS

| 5,192,896 A | 3/1993 | Qin |
| 5,886,516 A | 3/1999 | Barrett |
| 5,986,898 A | * 11/1999 | Meitzner et al. ............. 363/21 |
| 6,310,786 B1 | * 10/2001 | Yasumura ................ 363/21.03 |

FOREIGN PATENT DOCUMENTS

| EP | 0 665 632 | 8/1995 |
| EP | 0 707 376 | 4/1996 |
| EP | 0 772 281 | 5/1997 |

OTHER PUBLICATIONS

Patent Abstracts of Japan JP 10070881 A (Matsushita Electric Works Co., Ltd.) Mar. 10, 1998.

* cited by examiner

*Primary Examiner*—Gregory J. Toatley, Jr.
*Assistant Examiner*—Gary L. Laxton
(74) *Attorney, Agent, or Firm*—Frommer Lawrence & Haug LLP; William S. Frommer; Darren M. Simon (57) ABSTRACT

A switching power circuit having a power factor improving circuit for a composite resonance type converter, wherein a switching pulse is fed back from a tertiary winding, which is coiled around an insulating converter transformer, via a series resonance capacitor. And a rectified current is turned on and off by a fast recovery diode in accordance with the feedback output, hence achieving power factor improvement. In this structure, a smoothing capacitor is charged with the resonance current even during an off-period of the fast recovery diode due to the resonance of a series resonance circuit including the series resonance capacitor. This circuit configuration eliminates the necessity of selection of a higher withstand voltage relative to the primary-side smoothing capacitor by suppressing rise of the DC input voltage in a no-load state.

2 Claims, 9 Drawing Sheets

FIG. 1

FIG. 2A
VAC

FIG. 2B
IAC

POWER FACTOR IMPROVING SWITCHING CIRCUIT

BACKGROUND OF THE INVENTION

The present invention relates to a switching power circuit equipped with a power factor improving circuit.

Previously to date the present applicant proposed a variety of power circuits each having a resonance type converter on its primary side, and also other various power circuits each having a power factor improving circuit to achieve improvement of the power factor for a resonance type converter.

Figure 6:
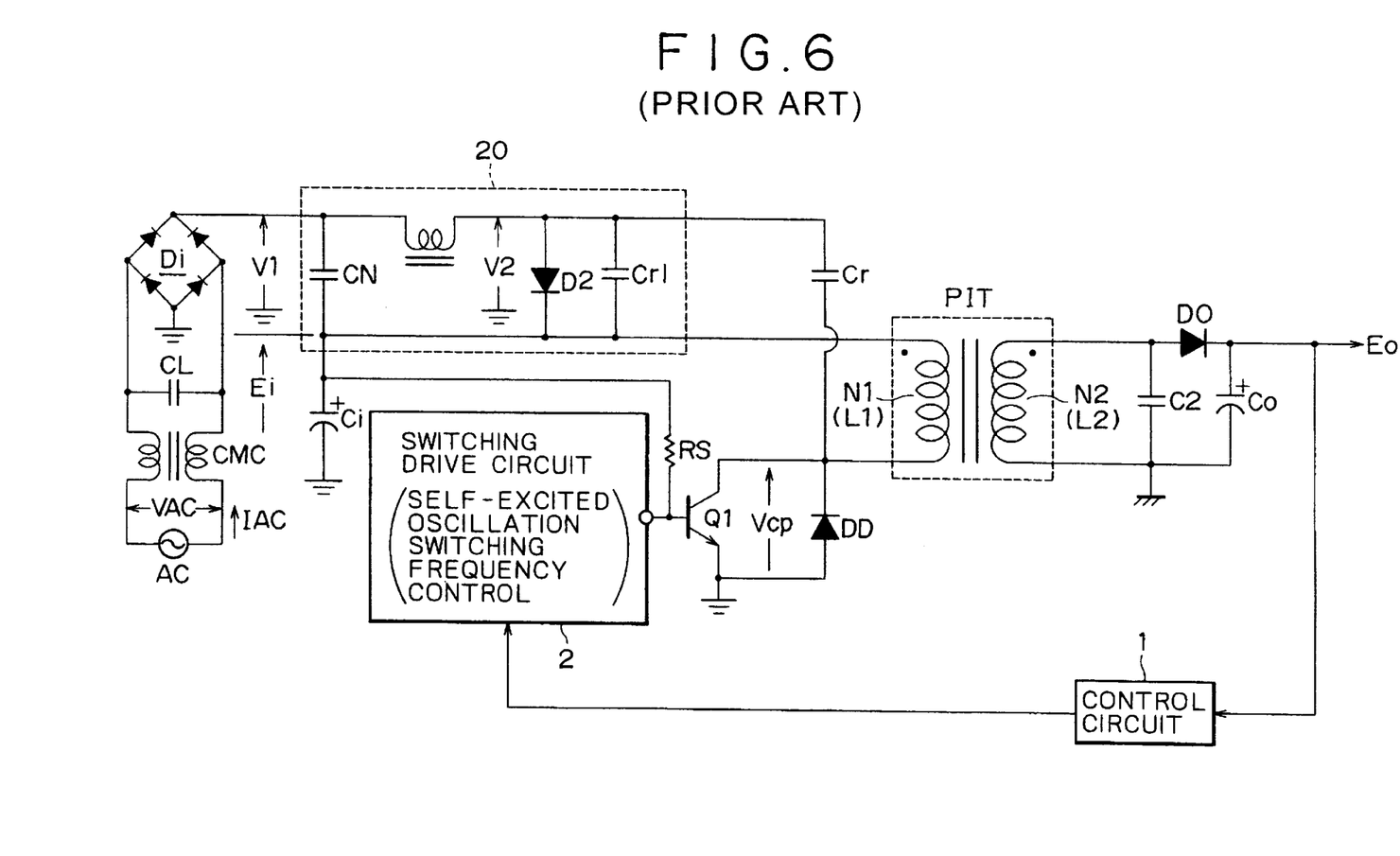
FIG. 6 is a circuit diagram showing a known configuration of a switching power circuit according to the prior art.

FIG. 6 is a circuit diagram showing an exemplary switching power circuit of a configuration based on the invention filed previously by the present applicant. This power circuit is equipped with a power factor improving circuit to attain improvement of the power factor for a self-excited voltage resonance type switching converter.

In the switching power circuit shown in this diagram, there are provided a common mode choke coil CMC and an across capacitor CL which constitute a noise filter to remove the common mode noise with regard to an alternating current power AC.

The alternating current power AC is full-wave rectified by a bridge rectifier circuit Di consisting of four diodes, and the rectified output is supplied to charge a smoothing capacitor Ci via a power factor improving circuit 20. The circuit configuration of the power factor improving circuit 20 and the operation thereof will be described later.

In this diagram, the voltage resonance type switching converter has a switching element Q1 consisting, for example, of a high-voltage withstanding bipolar transistor. That is, this switching converter is in a single end form.

The base of the switching element Q1 is connected to the positive side of the smoothing capacitor Ci via a starting resistor RS, so that a base current at the start is obtained from a rectifier smoothing line. The base of the switching element Q1 is connected also to a switching drive circuit 2.

The switching drive circuit 2 consists of a self-excited oscillation driver for driving the switching element Q1 by self-excitation, and a switching frequency controller for stabilizing the voltage by varying the oscillation frequency (i.e., switching frequency) in the self-excited oscillation driver.

In a specific configuration of such switching drive circuit 2, as seen in the various power circuits proposed previously by the present applicant, the self-excited oscillation driver consists, for example, of a resonance circuit composed of a driving coil and a resonance capacitor, and a detection coil for transferring the alternating voltage to the driving coil. Although not shown here, the detection coil is connected practically in series to a primary winding N1 for example. That is, the switching element Q1 is driven through switching by the resonance output of the resonance circuit in the self-excited oscillation driver, and the resonance frequency thereof is used as a switching frequency.

The switching frequency controller has a structure adapted to vary the resonance frequency. For this purpose, a control transformer PRT is provided to vary the inductance of the driving coil for example. In this control transformer PRT, the driving coil and the detection coil for example are transformer-coupled to each other, and a control coil is wound in such a manner that the winding direction thereof is not coincident with that of the driving coil and the detection coil. A DC control current outputted from the control circuit 1 is supplied to the control coil.

In the control circuit 1, a control current of a level corresponding to a secondary side DC output voltage Eo is supplied to the control coil. In the control transformer PRT, the inductance of the driving coil is varied in accordance with the level of the control current flowing in the control coil. As the inductance of the driving coil is thus varied, the resonance frequency of the self-excited oscillation driver, i.e., the switching frequency, is also varied under control.

A detailed description will be given later on a constant voltage regulating action executed with such switching frequency control.

The collector of the switching element Q1 is connected to the positive terminal of the smoothing capacitor Ci via the primary winding N1 of the insulating converter transformer PIT, and the emitter thereof is grounded.

In this case, a clamp diode DD is connected between the collector and emitter of the switching element Q1, thereby forming a path where a damper current flows at the off-time of the switching element Q1.

A first resonance capacitor Cr constitutes a parallel resonance circuit in combination with a second resonance capacitor Cr1 in an undermentioned power factor improving circuit 2 and principally with the leakage inductance of the primary winding N1 of the insulating converter transformer PIT. Due to the action of this parallel resonance circuit, the switching operation of the switching element Q1 is performed in a voltage resonance mode. And the end voltage VCP between the collector and emitter of the switching element Q1 is obtained in a waveform of sinusoidal pulses during the off-period of the switching element.

The insulating converter transformer PIT transfers the switching output of the switching element Q1 to the secondary side.

Figure 12:
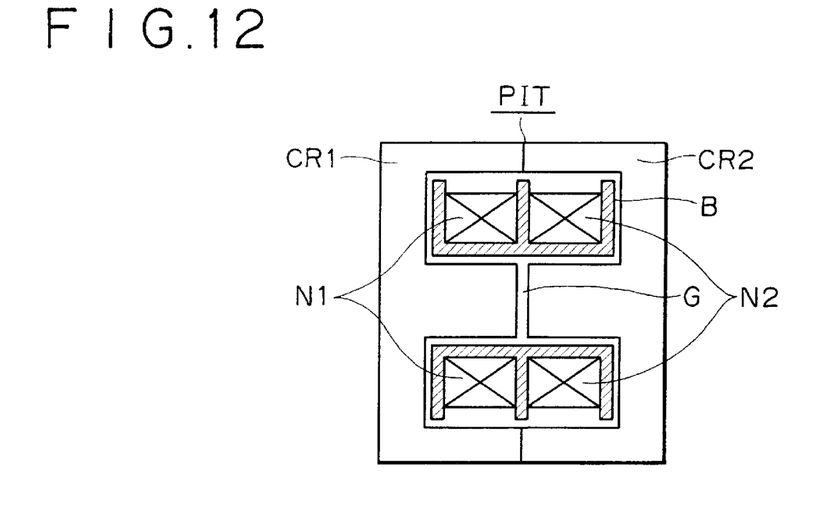
FIG. 12 is a sectional side view showing a structure of an insulating converter transformer employed in the power circuit of the embodiment.

As shown in FIG. 12, the insulating converter transformer PIT has an EE-shaped core where E-shaped cores CR1 and CR2 composed of ferrite for example are combined with each other in such a manner that magnetic legs thereof are opposed mutually, and the primary windings N1 and the secondary windings N2 thereof are coiled in a split state respectively by the use of a split bobbin B with regard to the center magnetic leg of the EE-shaped core. And a gap G is formed to the center magnetic leg as shown in the diagram, whereby loose coupling is attained with a required coupling coefficient.

The gap G can be formed by shaping the center magnetic leg of each of the E-shaped cores CR1 and CR2 to be shorter than the two outer magnetic legs thereof. The coupling coefficient k is set as, e.g., k≈0.85 suited to attain loose coupling, hence avoiding a saturated state correspondingly thereto.

One end of the primary winding N1 of the insulating converter transformer PIT is connected to the collector of the switching element Q1, while the other end thereof is connected to the positive side (rectified smoothed voltage Ei) of the smoothing capacitor Ci.

On the secondary side of the insulating converter transformer PIT, an alternating voltage induced by the primary winding N1 is generated in the secondary winding N2. In this case, since a secondary side parallel resonance capacitor C2 is connected to the secondary winding N2, a parallel resonance circuit is formed by the leakage inductance L2 of the secondary winding N2 and the capacitance of the secondary side parallel resonance capacitor C2. The alternating voltage thus produced in the secondary winding N2 is turned into a resonance voltage in the parallel resonance circuit. That is, a voltage resonance operation is performed on the secondary side.

More specifically, this power circuit has, on its primary side, a parallel resonance circuit to execute the switching operation in a voltage resonance mode, and also has, on its secondary side, another parallel resonance circuit to perform a voltage resonance operation in the rectifier circuit. In this specification, the switching converter of a configuration equipped with resonance circuits on its primary and secondary sides as mentioned above will be referred to as "composite resonance type switching converter".

In the secondary side parallel resonance circuit formed as described, a center tap is provided for the secondary winding N2, and there is also provided a half-wave rectifier circuit consisting of a rectifier diode D0 and a smoothing capacitor Co. This half-wave rectifier circuit receives an input resonance voltage supplied from the secondary side parallel resonance circuit and delivers a DC output voltage Eo therefrom.

In the insulating converter transformer PIT, the mutual inductance M regarding the inductance L1 of the primary winding N1 and the inductance L2 of the secondary winding N2 becomes either +M or −M depending on the relation of the polarities (winding directions) of the primary winding N1 and the secondary winding N2 to the connection of the rectifier diode D0.

Figure 13A:
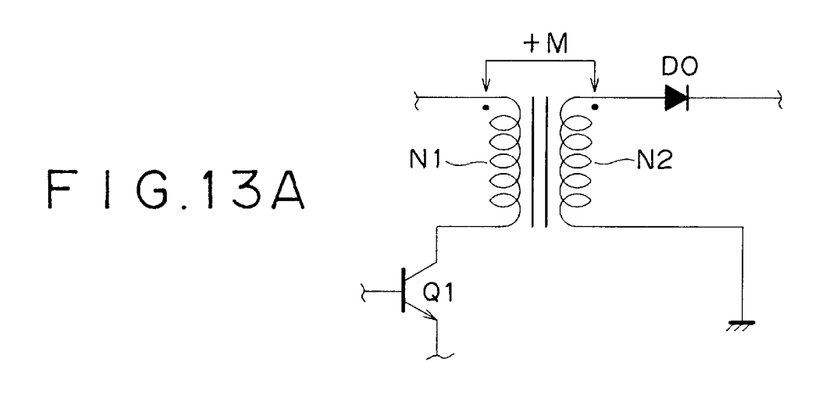
FIGS. 13A and 13B are explanatory diagrams showing the operations performed when the mutual inductance is in +M and −M modes respectively.
Figure 13B:
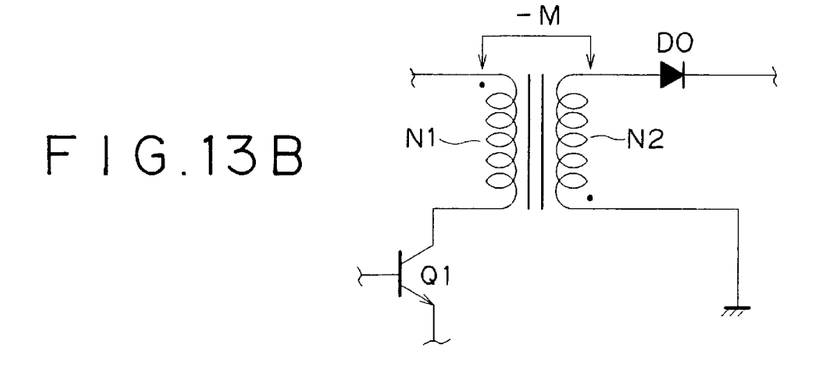

For example, if the connection is in a state of FIG. 13A, the mutual inductance becomes +M (forward mode). Meanwhile, if the connection is in a state of FIG. 13B, the mutual inductance becomes −M (flyback mode).

Applying the above to the secondary side operation of the power circuit shown in FIG. 6, when the alternating voltage obtained in the secondary winding N2 is positive for example, it is supposed that the operation with the rectified current flowing in the rectifier diode D0 is performed in the +M (forward) mode. That is, in the power circuit of FIG. 6, the mutual inductance functions in the +M (forward) mode every time the alternating voltage obtained in the secondary winding is turned to positive/negative.

In this configuration, the power is supplied to the load increased by the action of the secondary side parallel resonance circuit, so that the power supplied to the load is also increased correspondingly thereto to consequently enhance the increase rate of the maximum load power.

Such correspondence to the load condition can be realized due to the improved situation where a saturated state is not reached readily because of the loose coupling attained by a required coupling coefficient with the gap G formed in the insulating converter transformer PIT, as explained previously with reference to FIG. 12. For example, in case the gap G is not existent in the insulating converter transformer PIT, the operation will be abnormal with a high probability as the insulating converter transformer PIT is placed in its saturated state during the flyback, whereby proper execution of the rectification is rendered considerably difficult.

In the circuit of FIG. 6 where the switching frequency is varied for constant voltage control, the switching frequency variation is executed under control to vary the on-time of the switching element Q1 while maintaining the off-time thereof fixed. That is, in this power circuit, the constant voltage control is performed to vary the switching frequency under control to thereby control the resonance impedance with regard to the switching output, and simultaneously the conduction angle control (PWM control) of the switching element in the switching period is also performed. Such composite control operation is realized in a single set of control circuitry.

In executing such switching frequency control, when the secondary side output voltage is increased due to a trend of reduction of the load for example, the secondary side output is suppressed under control by raising the switching frequency.

The power factor is improved by the power factor improving circuit 20.

As shown in this diagram, the power factor improving circuit 20 has a series connected circuit of a choke coil Ls and a fast recovery diode D2 inserted between the positive output of a bridge rectifier circuit Di and the positive terminal of a smoothing capacitor Ci. The anode of the fast recovery diode D2 is connected to the choke coil Ls, while the cathode thereof is connected to the positive terminal of the smoothing capacitor Ci. The choke coil Ls functions as a load of the switching output fed back as will be described later.

And a filter capacitor CN is connected in parallel to the series connection of the choke coil Ls and the fact recovery diode D2. In this circuit, the choke coil Ls and the filter capacitor CN constitute a normal-mode LC low pass filter which prevents inflow of any switching high-frequency noise into the AC line.

The junction (voltage division point) in the aforementioned series connection of the first parallel resonance capacitor Cr and the second parallel resonance capacitor Cr1 is connected to the junction of the choke coil Ls and the fast recovery diode D2.

It is supposed here that the respective values are selectively set as the first parallel resonance capacitor Cr=8200 pF, second parallel resonance capacitor Cr1=0.027 μF, choke coil Ls=75 μH, and filter capacitor CN=1 μF.

In the power factor improving circuit 20 of such a connected circuit configuration, a resonance pulse voltage Vcp obtained at the off-time during the switching operation of the switching element Q1 is divided by the series connection of the first parallel resonance capacitor Cr and the second parallel resonance capacitor Cr1, and then the divided voltage is impressed in such a manner as to be fed back to the junction of the choke coil Ls and the fast recovery diode D2.

When the resonance pulse voltage Vcp is 600 Vp for example, a voltage of approximately 150 vp obtained through voltage division at 3:1 or so is fed back to the junction of the choke coil Ls and the fast recovery diode D2.

At the timing when the alternating input voltage VAC reaches the vicinity of its positive or negative peak, the fast recovery diode D2 is turned on. At this time, a pulse current having a steep rise waveform comes to flow from the output terminal of the bridge rectifier circuit Di into the smoothing capacitor Ci to charge the same via the choke coil Ls and the fast recovery diode D2.

Meanwhile, in any other period than when the alternating input voltage VAC reaches the vicinity of its positive or negative peak, the fast recovery diode D2 repeats its switching operation in accordance with the resonance pulse voltage fed back as voltage V2, as mentioned. And at the timing when the fast recovery diode D2 is turned off during the switching operation, a parallel resonance current flows in a circuit consisting of the second parallel resonance capacitor Cr1, the choke coil Ls and the filter capacitor CN. Meanwhile, at the timing when the fast recovery diode D2 is turned on, a high-frequency charge current flows in the smoothing capacitor Ci from the alternating input voltage VAC via the choke coil Ls.

In this manner, utilizing the primary side voltage resonance pulse fed back to the rectified current path, the current to be caused to flow in the rectified current path is converted into a high-frequency current to attain an alternating action, hence widening the conduction angle of the alternating input current IAC to consequently improve the power factor.

Figure 7:
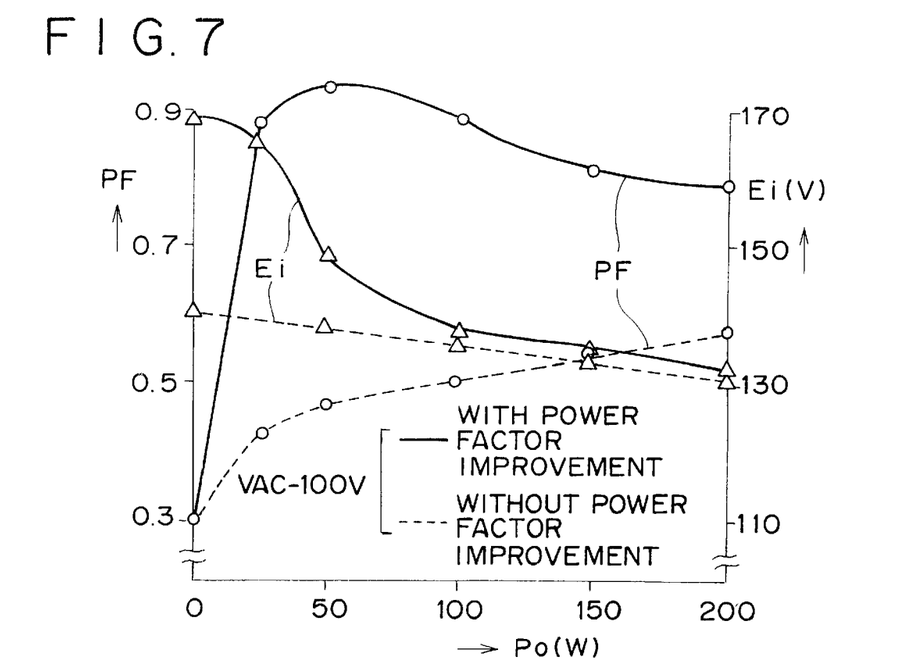
FIG. 7 is a characteristic diagram showing the relationship between a power factor and a DC input voltage level to variations of a load power in the switching power circuit of FIG. 6.

FIG. 7 graphically shows characteristics of the power circuit having the configuration of FIG. 6, including changes of the power factor derived from load variations and also changes of the DC input voltage (rectified smoothed voltage Ei). This diagram represents a comparison between the characteristics (solid line) of the circuit equipped with the power factor improving circuit 20 of FIG. 6 and the characteristics of another circuit which is not equipped with the power factor improving circuit 20 of FIG. 6.

According to this graphic diagram, it is obvious that, in a range of the load power Po from 0 W to 200 W, the power factor PF is improved more in the circuit configuration with the power factor improving circuit 20 of FIG. 6 than in another circuit configuration without the power factor improving circuit. Particularly in the circuit shown in FIG. 6, there is attained such characteristic that the power factor indicates its peak value when the load power Po is 50 W or so.

It is also seen that the level of the rectified smoothed voltage Ei tends to become higher in accordance with reduction of the load power Po.

Figure 8:
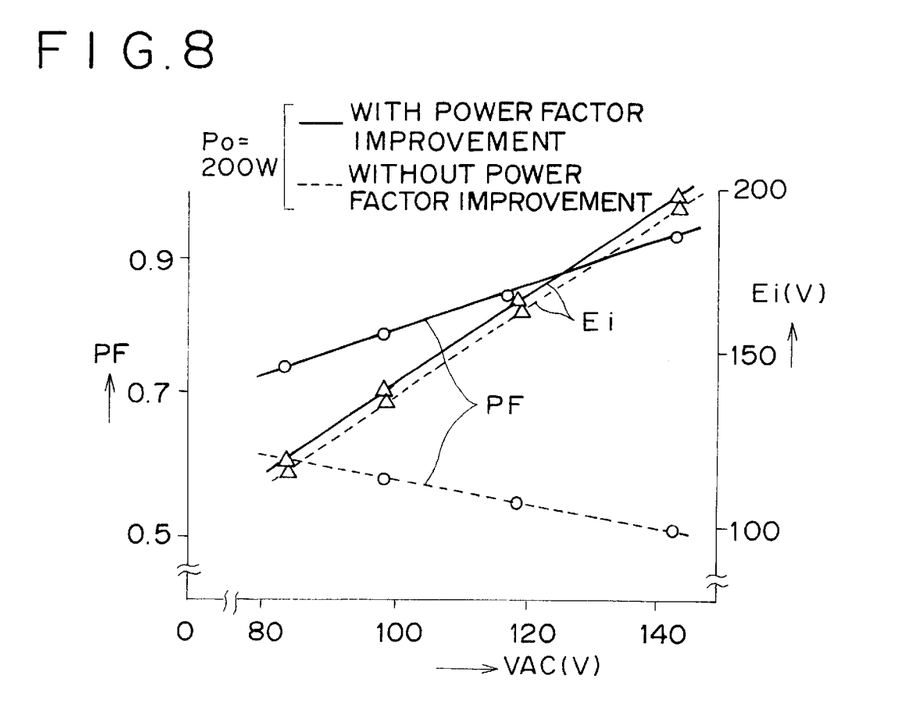
FIG. 8 is a characteristic diagram showing the relationship between a power factor and a DC input voltage level to variations of an alternating input voltage in the switching power circuit of FIG. 6.

FIG. 8 graphically shows change characteristics of the power factor relative to variations of the alternating input voltage VAC and the DC input voltage (rectified smoothed voltage Ei). This diagram also represents a comparison between the characteristics (solid line) of the circuit equipped with the power factor improving circuit 20 of FIG. 6 and the characteristics of another circuit which is not equipped with the power factor improving circuit 20 of FIG. 6.

As shown in this diagram, the characteristic obtained is such that the power factor is lowered in the circuit configuration where none of power factor improvement is performed in accordance with a rise of the alternating input voltage VAC in a range of 80 V to 140 V, while the power factor PF can be enhanced in the circuit of FIG. 6, where the power factor PF is increased with a rise of the alternating input voltage VAC.

There is further achieved such characteristic that the rectified smoothed voltage Ei is raised with a rise of the alternating input voltage VAC.

Figure 9:
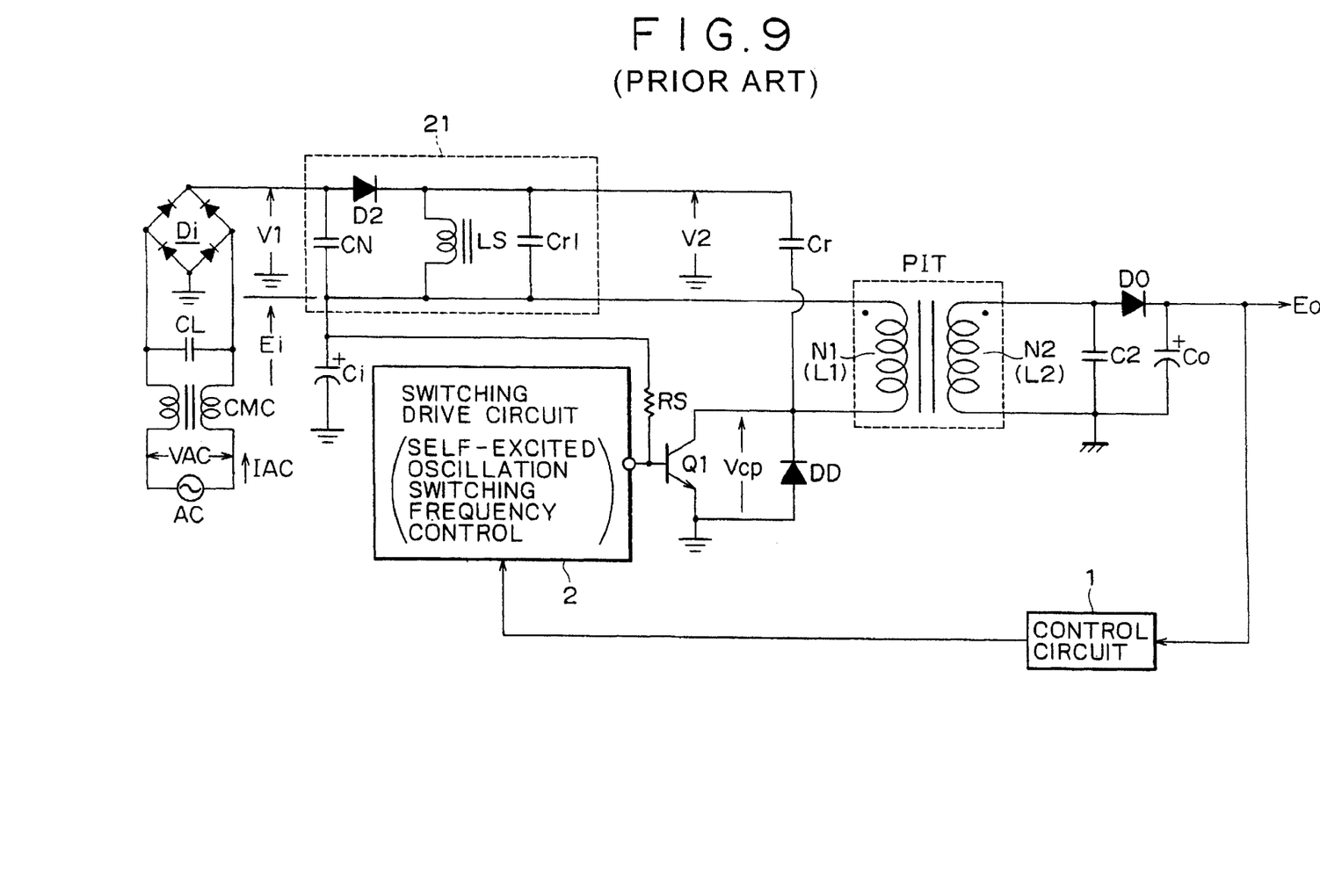
FIG. 9 is a circuit diagram showing another known configuration of a switching power circuit according to the prior art.

FIG. 9 shows another example of a switching power circuit constituted on the basis of the invention proposed previously by the present applicant. In this power circuit also, a power factor improving circuit is included to achieve power factor improvement for a self-excited voltage resonance type switching converter. In this diagram, any component parts equivalent to those in FIG. 6 are denoted by the same reference numerals, and a repeated explanation thereof is omitted.

The power circuit shown in this diagram is equipped with a power factor improving circuit 21. In comparison with the aforementioned power factor improving circuit 20 of FIG. 6, this power factor improving circuit 21 is different in the point that the fast recovery diode D2 and the choke coil Ls therein are connected reversely. That is, the anode of the fast recovery diode D2 is connected to the positive output terminal of the bridge rectifier circuit Di, and the cathode thereof is connected to one end of the choke coil Ls. Meanwhile the other end of the choke coil Ls is connected to the positive terminal of the smoothing capacitor Ci. And resonance pulses voltage Vcp, which are obtained through voltage division by a first parallel resonance capacitor Cr and a second parallel resonance capacitor Cr1, are impressed to the junction of the fast recovery diode D2 and the choke coil Ls.

In such circuit configuration also, the fast recovery diode D2 is turned on at the timing when the alternating input voltage VAC reaches the vicinity of its positive or negative peak, and a pulse current having a steep rise waveform comes to flow from the output terminal of the bridge rectifier circuit Di into the smoothing capacitor Ci to charge the same via the fast recovery diode 2 and the choke coil Ls.

In this case, the fast recovery diode D2 is temporarily turned off when the absolute value of the alternating input voltage VAC has lowered to a certain level, and voltage resonance is induced at this time by a parallel resonance circuit consisting of the second parallel resonance capacitor Cr1 and the choke coil Ls. Due to such voltage resonance, a sine-wave pulse voltage is superposed on the cathode potential V2 (divided resonance pulse voltage) of the fast recovery diode D2. Subsequently the fast recovery diode D2 repeats its switching operation in response to the potential difference between the cathode potential V2 and the anode potential V1 of the fast recovery diode D2. And a charge current is caused to flow from the filter capacitor CN into the smoothing capacitor Ci during the on-time of the fast recovery diode D2 in such switching operation. This performance extends the conduction angle of the alternating input current IAC to thereby improve the power factor.

Figure 10:
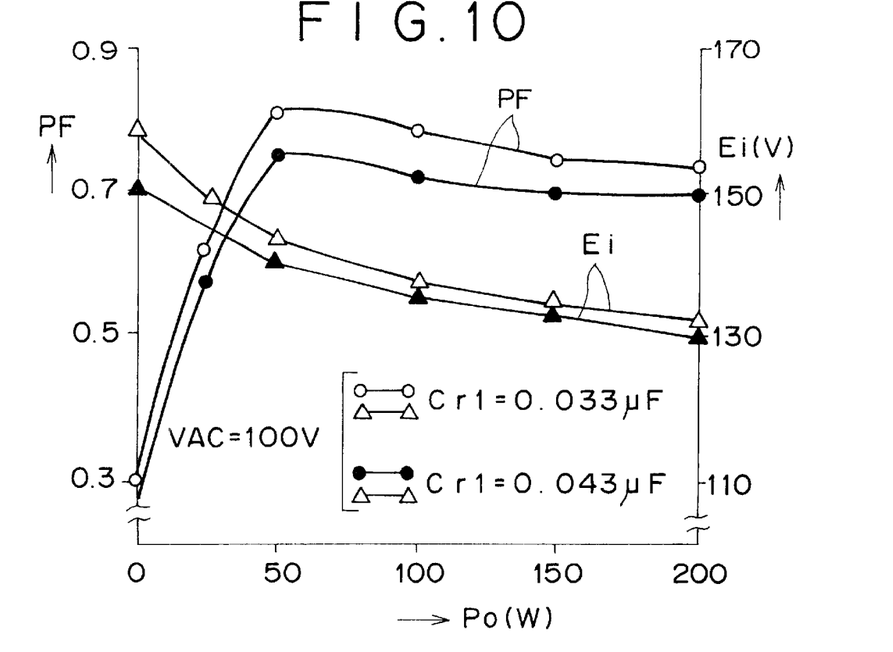
FIG. 10 is a characteristic diagram showing the relationship between a power factor and a DC input voltage level to variations of a load power in the switching power circuit of FIG. 9.

FIG. 10 graphically shows characteristics of the power circuit having the configuration of FIG. 9, including changes of the power factor derived from load variations and also changes of the DC input voltage (rectified smoothed voltage Ei). And FIG. 11 graphically shows change characteristics of the power factor relative to variations of the alternating input voltage and the DC input voltage (rectified smoothed voltage Ei). In view of a description to be given later, these diagrams represent the characteristics in one case where the constant of the second parallel resonance capacitor Cr1 is set to 0.033 $\mu$F and in another case where the constant is set to 0.043 $\mu$F.

First, as seen from FIG. 10, the power factor PF can be kept over 0.70 when the load power Po is substantially within a practical range of 50 W to 200 W. Regarding the rectified smoothed voltage Ei, the result obtained indicates that the voltage Ei tends to rise in accordance with reduction of the load power Po.

Figure 11:
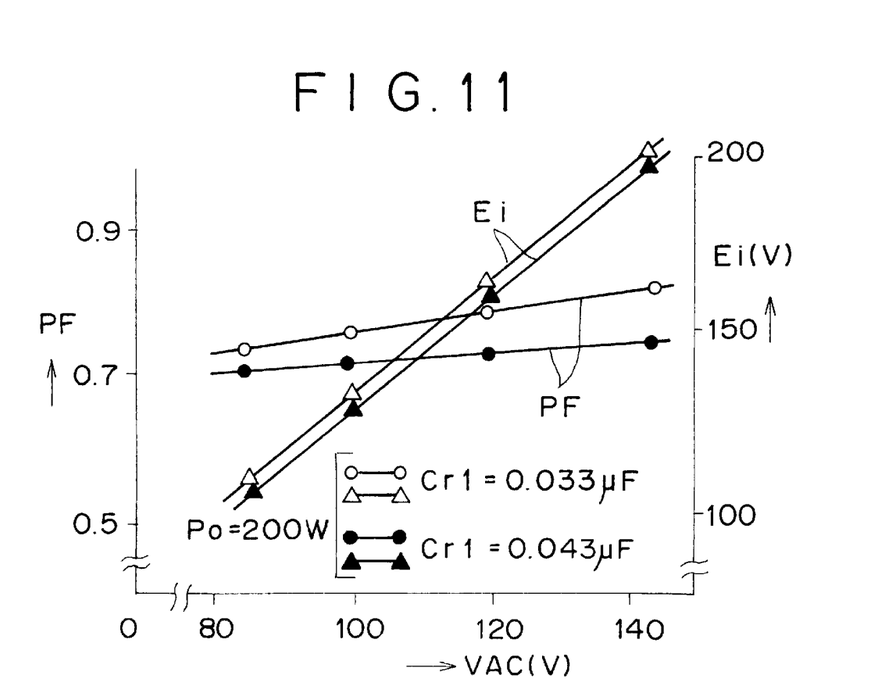
FIG. 11 is a characteristic diagram showing the relationship between a power factor and a DC input voltage level to variations of an alternating input voltage in the switching power circuit of FIG. 9.

And according to the characteristics shown in FIG. 11, it is seen that the power factor PF can be kept over 0.7 with respect to variations of the alternating input voltage VAC ranging from 80 V to 140 V, and the rectified smoothed voltage Ei rises in accordance with rise of the alternating input voltage VAC.

Although the power factor PF can thus be enhanced by the provision of such power factor improving circuit 20 or 21 as shown in FIG. 6 or 9, it is known that the ripple component superposed on the DC input voltage (rectified smoothed voltage Ei) is increased due to the circuit configuration of the power factor improving circuit 20 or 21 where the switching output is fed back to the rectified current path.

In the circuit of FIG. 6 for example, the ripple component $\Delta$Ei of 9.2 V, which is superposed on the rectified smoothed voltage Ei in the configuration without the power factor improving circuit 20, increases to 35.3 V in the configuration equipped with the power factor improving circuit 20. Particularly in a no-load state, the ripple component $\Delta$Ei rises to 26 V or so.

The same result is attainable also in the power circuit of the configuration shown in FIG. 9.

Supposing now that, in the configuration of FIG. 9 for example, the respective values are selectively set as the first parallel resonance capacitor Cr=8200 pF, the second parallel resonance capacitor Cr1=0.027 μF and the choke coil Ls=75 μH, then the power factor PF can be kept over 0.73 with the load power Po ranging from 25 W to 200 W, but the ripple component ΔEi increases to 31.8 V.

In the circuit of FIG. 9, if the value of the second parallel resonance capacitor Cr1 is set to 0.033 μF or 0.043 μF for changing the voltage division ratio of the first parallel resonance capacitor Cr and the second parallel resonance capacitor Cr1 to adjust (reduce) the feedback quantity of the voltage resonance pulses, then ripple component ΔEi decreases to 25.3 V in the case of Cr1=0.033 μF, or further decreases to 9.1 V in the case of Cr1=0.043 μF.

Thus, it is possible to suppress the ripple component ΔEi by reducing the feedback quantity of the voltage resonance pulses. However, if the feedback quantity of the voltage resonance pulses is reduced, the power factor PF is lowered. For example, such characteristic is shown in FIGS. 10 and 11 as well, wherein a higher power factor is obtained in the case of Cr1=0.043 μF than in the case of Cr1=0.033 μF. Therefore, in the circuit of FIG. 9 for example, adjustment is so executed as to suppress the ripple component ΔEi and to obtain a practically satisfactory power factor PF with a limit of Cr1=0.043 μF or so. The same may be said with regard to the circuit of FIG. 6 also.

In the circuits of FIGS. 6 and 9, the level of the DC input voltage (rectified smoothed voltage Ei) rises with reduction of the load power Po as shown in FIGS. 7 and 10 respectively, and its rise rate becomes high since the ripple component ΔEi increases particularly in accordance with approach to the no-load condition. This signifies an increase of the voltage variation rate in relation to any load variation.

Therefore, in an AC 100 V system, the required withstand voltage of the smoothing capacitor Ci for generating a DC input voltage is 200 V in a case without power factor improvement, but it needs to be 250 V in a configuration to execute power factor improvement. Further in an AC 200 V system, the required withstand voltage is 400 V in a case without power factor improvement, but it needs to be 500 V in a configuration to execute power factor improvement.

As a result, there exists a problem that the smoothing capacitor Ci is rendered dimensionally larger to eventually fail in downsizing the circuit and curtailing the production cost.

The smoothing capacitor Ci consists of an electrolytic capacitor for example, and if the selected withstand voltage of the electrolytic capacitor employed here has a higher value while the capacitance thereof is left unchanged, then its equivalent internal resistance increases to eventually increase also the amount of the self-generated heat. Therefore, the deterioration degree of the electrolytic capacitor due to its secular change becomes greater to consequently lower the reliability correspondingly thereto.

SUMMARY OF THE INVENTION

The present invention has been accomplished in view of the problems mentioned above.

According to the one aspect of the present invention, there is provided a switching power circuit comprises rectifying and smoothing means for generating a rectified smoothed voltage out of an input commercial AC power and outputting the same as a DC input voltage; an insulating converter transformer having a gap to obtain a required coupling coefficient for loose coupling and serving to transfer a primary output to a secondary side; switching means for outputting, to the primary winding of the insulating converter transformer, the switching output obtained through on/off control of the DC input voltage by a switching element; and a primary side parallel resonance circuit for actuating the switching means in a voltage resonance mode, wherein the resonance circuit consists at least of a leakage inductance component including the primary winding of the insulating converter transformer, and a capacitance of a parallel resonance capacitor.

The switching power circuit also comprises power factor improving means to improve a power factor by feeding back the switching output, which is obtained in the primary winding, to a rectified current path.

The switching power circuit further comprises a secondary side resonance circuit formed on the secondary side and consisting of a leakage inductance component of the secondary winding of the insulating converter transformer and a capacitance of a secondary side resonance capacitor; DC output voltage generating means formed inclusive of the secondary side resonance circuit and rectifying the input alternating voltage obtained from the secondary winding of the insulating converter transformer, thereby generating a secondary side DC output voltage; and constant voltage control means for executing constant voltage control of the secondary side DC output voltage in accordance with the level of the secondary side DC output voltage.

The power factor improving means consists at least of a tertiary winding coiled for the insulating converter transformer in such a manner as to wind up the primary winding; a resonance capacitor inserted for feeding back, to the rectified current path via the capacitance thereof, the switching output transferred from the primary winding to the tertiary winding; a switching element inserted in the rectified current path to execute a switching operation in accordance with the switching output fed back to the current path; and an inductor inserted in the rectified current path.

According to the configuration described above, the power factor improving circuit, which is included in the power circuit termed a composite resonance type converter, transfers to the tertiary winding the switching output obtained in the primary winding of the insulating converter transformer, and then feeds back the switching output from the tertiary winding to the rectified current path via the resonance capacitor. In this configuration, the switching output transferred via the tertiary winding serves to produce a period during which the resonance circuit composed of the resonance capacitor and the inductor in the power factor improving means performs its resonance operation.

The above and other features and advantages of the present invention will become apparent from the following description which will be given with reference to the illustrative accompanying drawings.

DETAILED DESCRIPTION OF THE PREFERRED EMBODIMENTS

Figure 1:
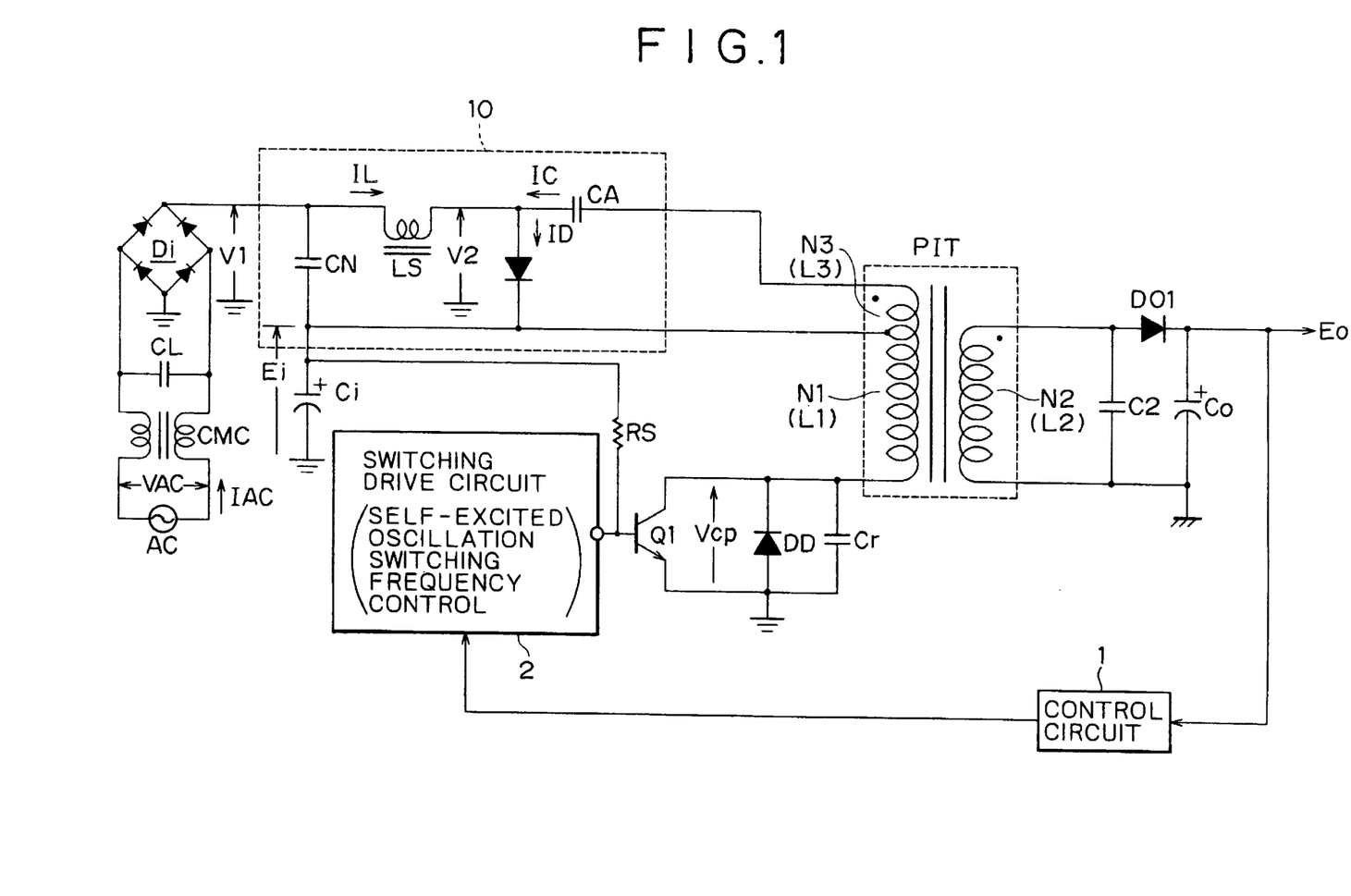
FIG. 1 is a circuit diagram showing an exemplary configuration of a switching power circuit as an embodiment of the present invention.

FIG. 1 is a circuit diagram showing an exemplary configuration of a power circuit as a preferred embodiment of the present invention.

The power circuit shown in this diagram is also equipped with an insulating converter transformer PIT having the structure of FIG. 12 to thereby constitute a composite resonance type converter. In this diagram, any component parts equivalent to those shown in FIGS. 6 and 9 are denoted by the same reference numerals or symbols, and a repeated explanation thereof is omitted.

In the power circuit shown in this diagram, a tertiary winding N3 is coiled on the primary side of the insulating converter transformer PIT. In this case, the tertiary winding N3 is so formed as to wind up the beginning side of the primary winding. The end of the tertiary winding N3 (beginning of the primary winding) is connected to a series resonance capacitor CA of a power factor improving circuit 10 which will be mentioned next.

The power factor improving circuit 10 shown in this diagram has the following circuit configuration.

A choke coil Ls and a fast recovery diode D2 are connected in series to each other to thereby form a series connected circuit. This circuit is inserted between a positive output of a bridge rectifier circuit Di and a positive terminal of a smoothing capacitor Ci. In this case, the anode of the fast recovery diode D2 is connected to the positive terminal of the bridge rectifier circuit Di via the choke coil Ls, and the cathode thereof is connected to the positive terminal of the smoothing capacitor Ci.

A filter capacitor CN is connected in parallel to the series connection of the choke coil Ls and the fast recovery diode D2.

In this case, a series resonance capacitor CA is also provided. This series resonance capacitor CA is inserted between the junction of the choke coil Ls and the fast recovery diode D2 and the end of the tertiary winding N3 (beginning of the primary winding). A series resonance circuit is constituted at least of the capacitance of the series resonance capacitor CA and the respective inductances of the choke coil Ls and the tertiary winding N3.

It is supposed that, in the configuration of FIG. 1, the respective values are selectively set as the primary winding N1=45T, tertiary winding N3=4T, series resonance capacitor CA=0.027 $\mu$F, and choke coil Ls=13 $\mu$H.

The parallel resonance capacitor Cr in this case is connected in parallel between the collector and emitter of a switching element Q1, and the capacitance thereof constitutes, in combination with the leakage inductance of the primary winding N1 of the insulating converter transformer PIT, a parallel resonance circuit which turns the switching operation into voltage resonance type.

According to this configuration, a resonance pulse voltage Vcp generated during the off-time by the switching element Q1 in its switching operation is transferred to the tertiary winding N3 via the primary winding N1. And the alternating resonance pulse voltage Vcp thus transferred to the tertiary winding N3 is fed back via the series resonance capacitor CA to the junction of the choke coil Ls and the fast recovery diode D2.

FIG. 2 shows waveforms representing, in accordance with the power supply period, the operations of principal portions in the power circuit having the configuration of FIG. 1. The operation shown in this diagram is performed under the conditions of an alternating input voltage VAC=100 V and a maximum load power=200 W.

Figure 2A:
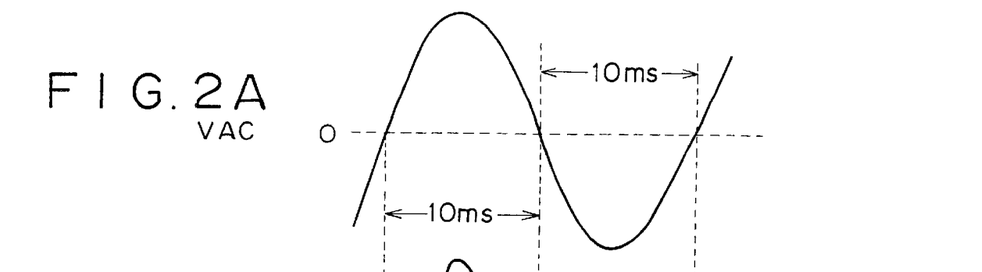
FIGS. 2A to 2G are waveform charts showing the operation of the switching power circuit in FIG. 1.
Figure 2B:
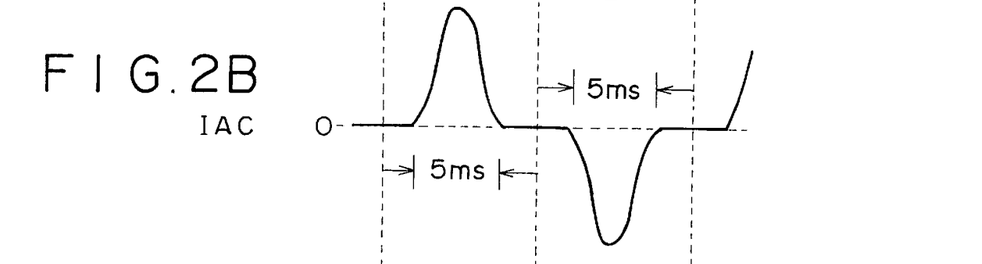
Figure 2C:
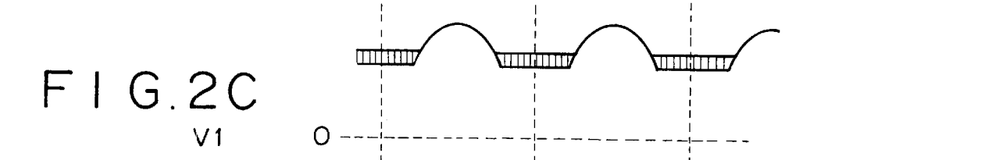

It is supposed that the commercial power employed here has a frequency of 50 Hz, and the alternating input voltage VAC has a sinusoidal waveform whose half period is 10 ms, as shown in FIG. 2A. And when a rectified current is outputted from the bridge rectifier circuit Di correspondingly to flow of an alternating input current IAC as shown in FIG. 2B, the fast recovery diode D2 executes its switching operation in a manner to turn on and off such rectified current.

Figure 2D:
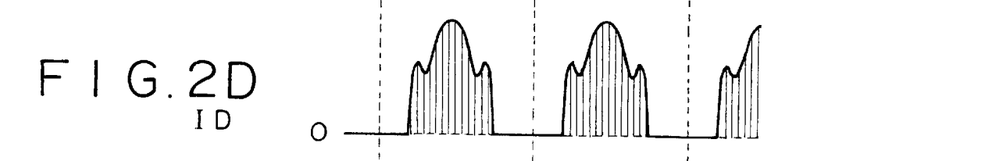

In this embodiment, the fast recovery diode D2 executes its switching action in a period of 5 ms during which an alternating input voltage VAC is high to cause flow of an alternating input current IAC. However, in another period during which the alternating input voltage VAC is low to cause no flow of the alternating input current IAC, the fast recovery diode D2 does not execute its switching action. Therefore, the switching current ID flowing in the fast recovery diode D2 becomes such as shown in FIG. 2D. In a period during which the alternating input voltage VAC is high, the charge current flowing into the smoothing capacitor Ci is caused to flow via a path of filter capacitor CN→choke coil Ls→fast recovery diode D2. As a result, the conduction angle relative to the alternating input current IAC shown in FIG. 2B is practically widened to achieve improvement of the power factor.

Figure 2E:
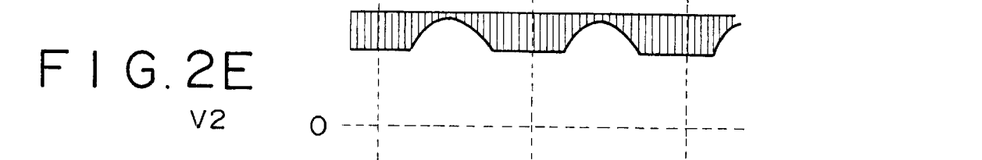

And in conformity with this operation, the cathode potential V2 of the fast recovery diode D2 is turned to an alternating voltage having an envelope of FIG. 2E.

Regarding the operation of the fast recovery diode D2, there is performed, during the off-period of the fast recovery diode D2, a resonance operation in a series resonance circuit which consists of the series resonance capacitor CA, the choke coil Ls, the filter capacitor CN and the tertiary winding N3 (inductance L3), so that the alternating current Ic flowing into the series resonance capacitor CA becomes a resonance current flowing via a path of choke coil Ls→filter capacitor CN→tertiary winding N3.

On the other hand, there is not performed, during the on-period of the fast recovery diode D2, the resonance operation in the series resonance circuit, so that the alternating current Ic flows from the fast recovery diode D2 to the tertiary winding N3.

Figure 2F:
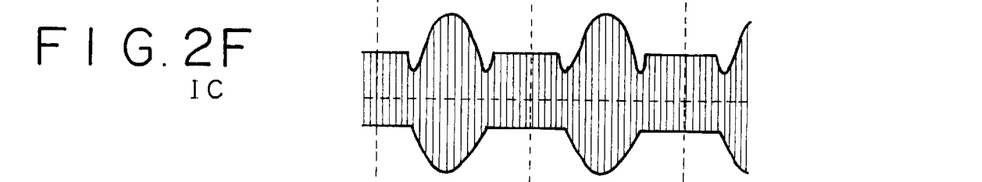
Figure 2G:
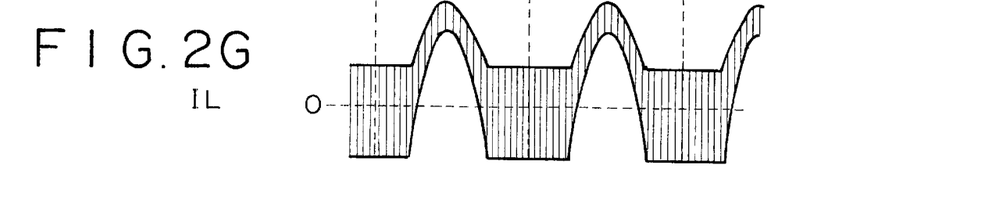

In conformity with the above operation, the alternating current Ic flowing in the series resonance capacitor CA and the current IL flowing in the choke coil Ls are such as shown in FIG. 2E and FIG. 2F respectively. The anode potential V1 of the fast recovery diode D2 is obtained in a waveform of FIG. 2C.

And due to the above operation, the voltage variation characteristic of the rectified smoothed voltage Ei to any load variation is improved in this embodiment, as will be described later.

Figure 3:
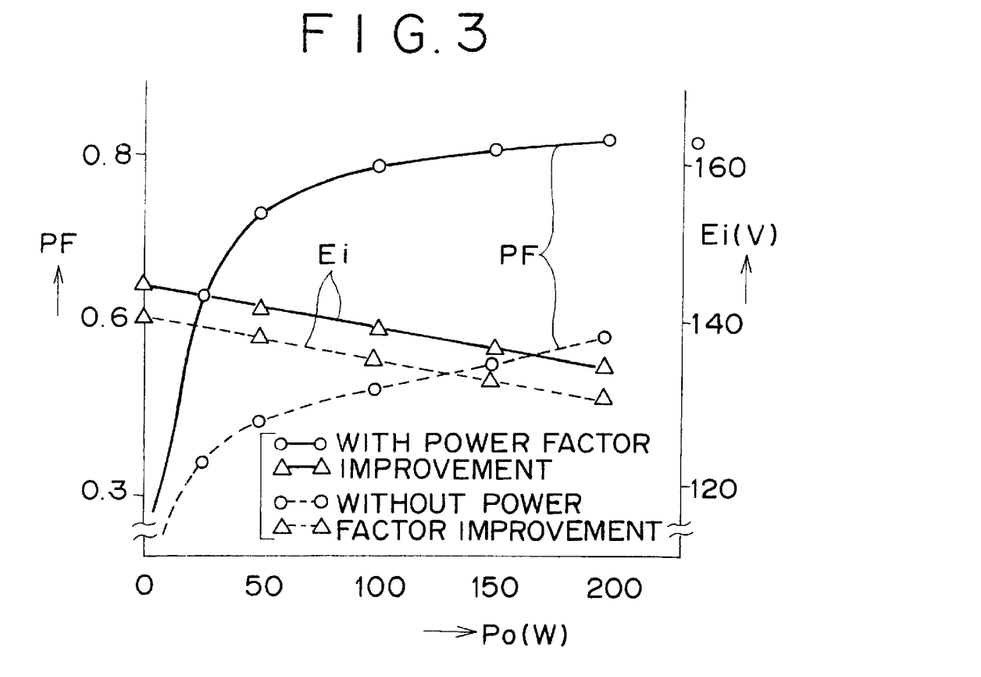
FIG. 3 is a characteristic diagram showing the relationship between a power factor and a DC input voltage level to variations of a load power in the switching power circuit of FIG. 1.
Figure 4:
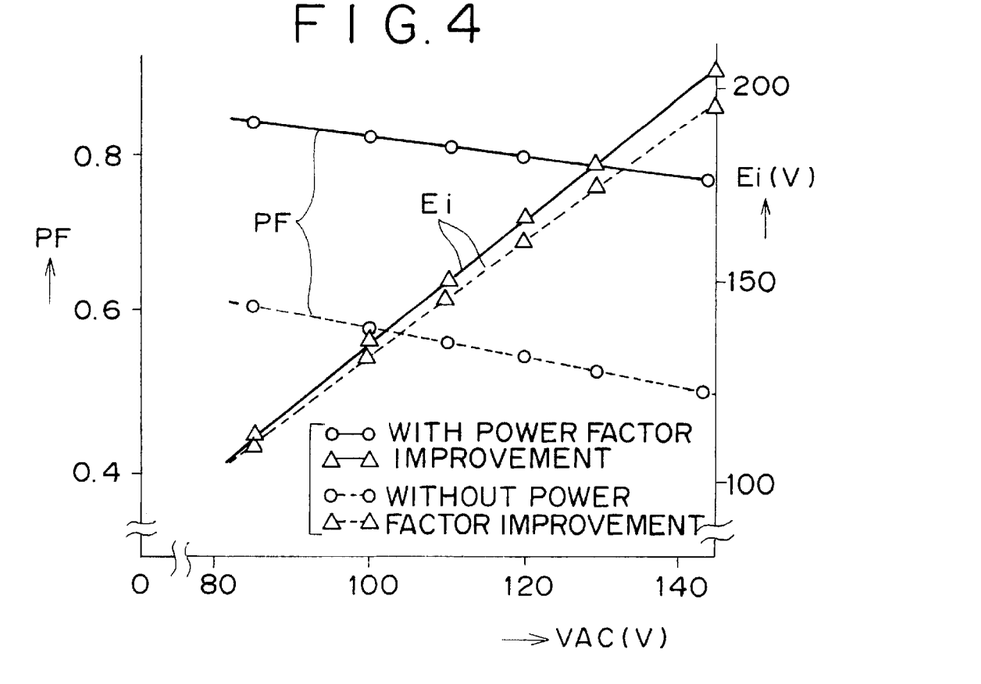
FIG. 4 is a characteristic diagram showing the relationship between a power factor and a DC input voltage level to variations of an alternating input voltage in the switching power circuit of FIG. 1.

FIGS. 3 and 4 graphically show the experimental results obtained with regard to the aforementioned power circuit of FIG. 1.

In obtaining such experimental results shown in these diagrams, operational conditions include a load power Po=200 W to 0 W and an alternating input voltage VAC=85 V to 144 V.

Also in FIGS. 3 and 4, there are shown both characteristics, as a comparison, of a circuit configuration (with power factor improvement) equipped with the power factor improving circuit 10 in FIG. 1 and a basic circuit configuration (without power factor improvement) not equipped with the power factor improving circuit 10 in FIG. 1.

First, FIG. 3 represents the relationship between a load and a power factor under certain conditions where the alternating input voltage VAC is maintained constant at 100 V.

In the circuit equipped with the power factor improving circuit, it is seen that, as shown in this diagram, the power factor PF is kept over 0.7 within a range the load power Po from 50 W to 200 W, and thus a wide improvement is attained in comparison with another circuit without the power factor improving circuit. The characteristic achieved here is such that the power factor PF rises in accordance with an increase of the load power Po.

As for the rectified smoothed voltage Ei, its steep rise that may be caused by any load power variation in a no-load state is suppressed as compared with the prior art. In the circuit equipped with the power factor improving circuit, the smoothed voltage Ei is steadily higher, regardless of the load power value, by 5 V or so than in the circuit which is not equipped with the power factor improving circuit. However, such a level rise is considered to be slight and free from the necessity of selecting a smoothing capacitor Ci for a higher withstand voltage. More specifically, with regard to the withstand voltage, it is possible, in the circuit with the power factor improving circuit, to employ a smoothing capacitor Ci equivalent to the one used in the circuit without the power factor improving circuit.

In the circuit equipped with the power factor improving circuit, its power conversion efficiency can be enhanced since the level of the rectified smoothed voltage Ei is higher by 5 V or so, as described above. It is confirmed that, when the load power is maximum, the power conversion efficiency is enhanced approximately by 0.3%.

FIG. 4 represents the relationship between the power factor and the rectified smoothed voltage Ei to variations of the alternating input voltage under certain conditions where the load power Po is maintained constant at 200 W.

It is seen also according to this diagram that, in the circuit equipped with the power factor improving circuit, the power factor PF is kept over 0.8 within a range of the alternating input voltage VAC from 85 V to 144 V, and thus a wide improvement is attained in comparison with another circuit without the power factor improving circuit.

And in this diagram also, there is indicated that the rectified smoothed voltage Ei in the circuit with the power factor improving circuit is steadily higher, regardless of any variation of the alternating input voltage VAC, by 5 V or so than in the circuit which is not equipped with the power factor improving circuit.

Figure 5:
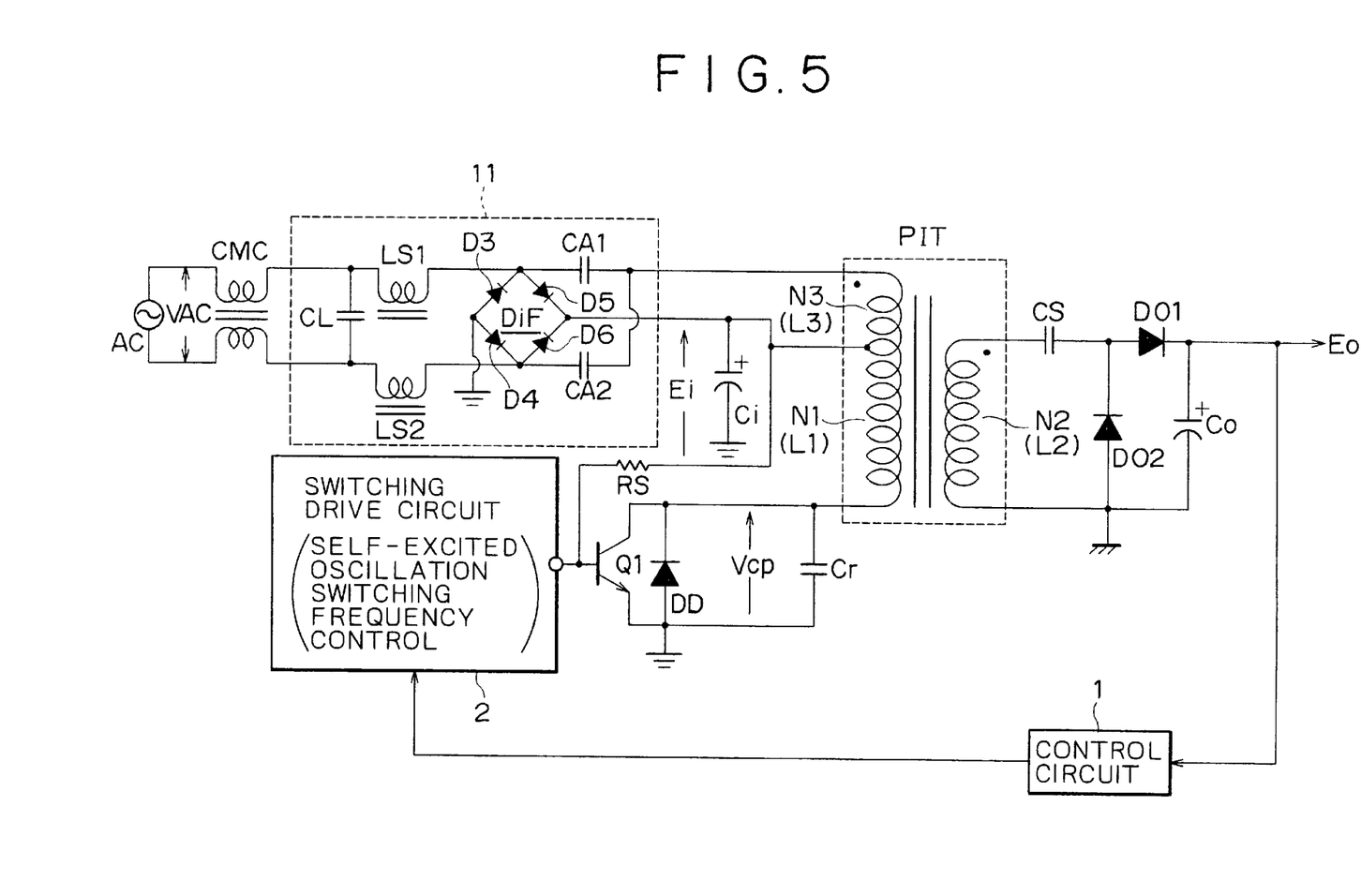
FIG. 5 is a circuit diagram showing another exemplary configuration of a switching power circuit as another embodiment of the present invention.

FIG. 5 is a circuit diagram showing an exemplary configuration of a power circuit as another preferred embodiment of the present invention. In this diagram, any component parts corresponding to those in FIG. 1 are denoted by the same reference numerals or symbols, and a repeated explanation thereof is omitted.

A power factor improving circuit 11 shown in this diagram includes a bridge rectifier circuit DiF which performs full-wave rectification of a commercial alternating power AC. Four diodes D3, D4, D5 and D6 constituting the bridge rectifier circuit DiF are of a fast recovery type. These diodes D3, D4, D5 and D6 function as switching elements for improvement of a power factor.

In conformity with the provision of the bridge rectifier circuit DiF in the power factor improving circuit, a choke coil Ls1 is inserted in series to the positive line of the commercial alternating power AC, and a choke coil Ls2 is inserted in series to the negative line thereof. The inductance values of these choke coils Ls1 and Ls2 are so selected as to satisfy the following condition in relation to the inductance value of the choke coil Ls in the aforementioned power factor improving circuit 10 of FIG. 1.

$$Ls1=Ls2=Ls/2$$

In the power factor improving circuit 11, an across capacitor CL functions as a filter capacitor CN shown previously in FIG. 1 for example.

Two series resonance capacitors CA1 and CA2 are provided. One series resonance capacitor CA1 is inserted between the beginning of a tertiary winding N3 and the positive input terminal of the bridge rectifier circuit DiF (junction of D3 and D5). Meanwhile, the other series resonance capacitor CA2 is inserted between the beginning of the tertiary winding N3 and the negative input terminal of the bridge rectifier circuit DiF (junction of D4 and D6).

In this configuration, a resonance pulse voltage Vcp generated during the off-time of a switching element Q1 in its switching operation is transferred from the primary winding N1 to the tertiary winding N3. And the resonance pulse voltage Vcp thus transferred is fed back via the series resonance capacitors CA1 and CA2 respectively to the positive and negative lines of a rectified current path including the bridge rectifier circuit DiF. And the diodes D3, D4, D5 and D6 constituting the bridge rectifier circuit DiF are switched by the switching output thus fed back. Due to this switching operation, the conduction angle of the alternating input current IAC is widened to consequently improve the power factor.

The achievable characteristics of this circuit are equivalent to those shown in FIGS. 3 and 4 which represent the foregoing embodiment. Therefore, in this case also, it is not necessary to select a capability of higher withstand voltage with respect to the smoothing capacitor Ci consisting of an electrolytic capacitor.

Comparing the circuit configuration of FIG. 5 with that of FIG. 1, it is seen that the fast recovery diode D2 and the filter capacitor CN are deleted in the circuit of FIG. 5. Further, the number of required component parts can be reduced by modularizing the bridge rectifier circuit DiF which consists of fast recovery diodes D3, D4, D5 and D6.

In this case, due to omission of the fast recovery diode D2, the power loss derived from the fast recovery diode D2 can be eliminated to consequently enhance the power conversion efficiency by 0.8% or so in comparison with the circuit shown in FIG. 1. And the input power can also be reduced by 1.8 W or so correspondingly thereto.

On the secondary side of the power circuit shown in this diagram, one end of the secondary winding N2 is connected to the secondary side ground, while the other end thereof is connected via a series connection of a series resonance capacitor Cs to the junction of the anode of a rectifier diode D01 and the cathode of a rectifier diode D02. The cathode of the rectifier diode D01 is connected to the positive terminal of a smoothing capacitor C01, and the anode of the rectifier diode D02 is connected to the secondary side ground. The negative terminal of the smoothing capacitor C01 is connected to the secondary side ground.

In such a state of connection, there is eventually provided a voltage multiplying full-wave rectifier circuit which consists of a combination of "series resonance capacitor Cs, rectifier diodes D01, D02 and smoothing capacitor C01". In this circuit, the capacitance of the series resonance capacitor Cs itself and the leakage inductance of the secondary winding N2 form a series resonance circuit conforming with the on/off action of the rectifier diodes D01 and D02.

That is, the power circuit in this embodiment adopts a configuration of a composite resonance type switching converter which comprises a parallel resonance circuit on its primary side to perform a switching operation in a voltage resonance mode, and a series resonance circuit on its secondary side to execute voltage multiplying full-wave rectification.

The voltage multiplying full-wave rectification is performed as follows by the combination of "series resonance capacitor Cs, rectifier diodes D01, D02 and smoothing capacitor C01".

When a switching output is obtained in the primary winding N1 due to the switching operation on the primary side, the switching output is induced in the secondary winding N2.

In a period during which the rectifier diode D01 is turned off while the rectifier diode D02 is turned on, the rectification is executed in a subtractive polarity mode where the polarity of the primary winding N1 and secondary winding N2 (mutual inductance M) becomes –M, so that an operation is performed to charge the series resonance capacitor Cs with the current rectified by the rectifier diode D02 due to the series resonance by the leakage inductance of the secondary winding N2 and the series resonance capacitor Cs.

And in another period during which the rectifier diode D02 is turned off while the rectifier diode D01 is turned on, the rectification is executed in an additive polarity mode where the polarity of the primary winding N1 and secondary winding N2 (mutual inductance M) becomes +M, so that an operation is performed to charge the smoothing capacitor C01 in a state of series resonance where the potential of the series resonance capacitor Cs is added to the voltage induced in the secondary winding N2.

As described above, the rectification is executed by utilizing an additive polarity mode (+M; forward operation) and a subtractive polarity mode (–M; flyback operation), hence obtaining, in the smoothing capacitor C01, a DC output voltage E01 which corresponds substantially to double the induced voltage in the secondary winding N2.

Thus, on the secondary side of the circuit shown in FIG. 5, voltage multiplying full-wave rectification is performed by utilizing the operation modes where the mutual inductance becomes +M and –M respectively, thereby producing a secondary side DC output voltage. The electromagnetic energies derived from both the primary current resonance and the secondary current resonance are supplied simultaneously to the load side, so that the power supplied to the load is further increased correspondingly thereto, hence achieving a wide increase of the maximum load power.

Since the secondary side DC output voltage is produced by the voltage multiplying full-wave rectifier circuit, it follows that the required number of turns of the secondary winding N2 in this embodiment can be reduced to half the number in the prior art when obtaining a level equivalent to the secondary side DC output voltage produced in the voltage multiplying full-wave rectifier circuit. This reduction in the number of turns brings about some merits of realizing smaller dimensions, less weight and lower production cost with regard to the insulating converter transformer PIT.

As for the composite resonance type switching converter, the present applicant has already proposed a configuration equipped with a full-wave rectifier circuit to a secondary side parallel resonance circuit, and another configuration equipped with a voltage-quadrupling rectifier circuit employing a secondary side series resonance circuit. It is to be understood that these configurations can also be established as modifications of this embodiment. More specifically, this embodiment is not limited particularly to the configuration of a secondary side resonance circuit and a rectifier circuit alone.

In each of the embodiments mentioned above, the primary side voltage resonance type converter adopts a self-excited structure, but the present invention is applicable to a separately excited structure as well.

In the latter case, for example, the self-excited oscillation driver may be replaced with an IC (integrated circuit) oscillation driver, and the switching element of the voltage resonance type converter may be driven by this oscillation driver.

In this case, constant voltage control is executed while changing the waveform of a driving signal generated by the oscillation driver in accordance with the secondary side output voltage level. Under such voltage control, the driving signal waveform is so changed as to maintain the off-time of the switching element constant and to shorten the on-time thereof in accordance with a rise of the secondary side output voltage level.

When such a separately excited structure is adopted, an orthogonal control transformer PRT is eliminated.

Also when a separately excited structure is adopted as mentioned, it is possible to replace the switching element Q1, which consists of one bipolar transistor (BJT), with a Darlington circuit where two bipolar transistors (BJT) are in Darlington connection. It is further possible to replace the switching element Q1 of one bipolar transistor (BJT) with a MOS-FET (MOS field effect transistor; metal oxide semiconductor), an IGBT (insulated-gate bipolar transistor), or a SIT (electrostatic induction thyristor). By using any of such Darlington circuit or the above device as a switching element, an enhanced efficiency is rendered attainable.

According to the present invention, as described hereinabove, a switching power circuit having a power factor improving circuit is provided in a composite resonance type converter equipped with a voltage resonance converter on its primary side and also with a resonance circuit on its secondary side, wherein an insulating converter transformer has a tertiary winding to which the output of a primary winding is transferred. And a resonance capacitor is provided in a route through which the output of the tertiary winding is fed back to a rectified current path.

Thus, the voltage resonance pulses obtained by the switching operation of the switching element are fed back from the tertiary winding to the rectified current path via the resonance capacitor. And the switching element performs its switching operation to turn on and off the rectified current in accordance with the switching output fed back to the rectified current path, hence improving the power factor.

In the present invention, the resonance circuit is formed by a combination of the resonance capacitor and the inductor in the power factor improving circuit, and during the off-time of the switching element, resonance of the resonance circuit is executed to cause flow of a resonance current.

Due to such operation, it becomes eventually possible to suppress a rise of the DC input voltage (rectified smoothed voltage) in a light-load or no-load state, so that the smoothing capacitor for obtaining the DC input voltage may be equivalent, with regard to the withstand voltage thereof, to the smoothing capacitor used conventionally in a known circuit which is not composed for power factor improvement. That is, the required withstand voltage of the smoothing capacitor need not be raised in conformity with the provision of the power factor improving circuit.

Accordingly, the smoothing capacitor is rendered free from a dimensional increase to consequently prevent an increase of the circuit size. And the production cost is not augmented either. Further, it becomes possible to minimize the secular change (deterioration) that results from raising the withstand voltage of the smoothing capacitor, hence enhancing the reliability of the power circuit from this point of view.

In the present invention, the number of required component parts for power factor improvement can be curtailed by utilizing, as a switching element in the power factor improving circuit, the diode which is included in the rectifier circuit to rectify a commercial alternating power, thereby achieving greater effects with regard to suppression of an increase of the production cost and also avoidance of a dimensional expansion of the circuit. Further, since any additional switching element need not be provided besides the diode in the rectifier circuit, the power conversion efficiency can be enhanced correspondingly thereto.

What is claimed is:
1. A switching power circuit comprising:

a rectifying circuit for generating a DC input voltage by rectifying and smoothing an input AC power signal;

an insulating converter transformer having a primary winding connected to a tertiary winding and separated by a gap from a secondary winding;

switching means for outputting, to the primary winding of said insulating converter transformer, the DC input voltage by operation of a switching element;

a primary side parallel resonance circuit for actuating said switching means in a voltage resonance mode, said primary side parallel resonance circuit including the primary winding of said insulating converter transformer and a parallel resonance capacitor;

a secondary side resonance circuit including the secondary winding of said insulating converter transformer and a secondary side resonance capacitor; the secondary winding generating a secondary side alternating voltage in response to the DC input voltage output to the primary winding of said insulating converter transformer by said switching means;

DC output voltage generating means connected to said secondary side resonance circuit and rectifying the secondary side alternating voltage obtained from the secondary winding of said insulating converter transformer, thereby generating a secondary side DC output voltage;

constant voltage control means for maintaining the secondary side DC output voltage at a constant voltage level by providing feedback to the switching element in accordance with the level of the secondary side DC output voltage; and power factor improving means for improving a power factor of said switching power circuit; said power factor improving means including the tertiary winding of the insulating converter transformer; a resonance capacitor for feeding back, to a rectified current path, the switched DC input voltage transferred from the primary winding to the tertiary winding; a fast recovery diode in the rectified current path to perform a switching operation in accordance with the switched DC input voltage fed back to the current path; and an inductor; the switched DC input voltage fed back via the tertiary winding resulting in an increased voltage across the fast recovery diode.

2. The switching power circuit according to claim 1, wherein the fast recovery diode in said power factor improving means further rectifying the input AC power signal in said rectifying circuit.

* * * * *